(12) United States Patent
Nishino

(10) Patent No.: US 11,388,296 B2
(45) Date of Patent: Jul. 12, 2022

(54) IMAGE SCANNING APPARATUS

(71) Applicant: KYOCERA Document Solutions Inc., Osaka (JP)

(72) Inventor: Tetsuya Nishino, Osaka (JP)

(73) Assignee: Kyocera Document Solutions, Inc.

( * ) Notice: Subject to any disclaimer, the term of this patent is extended or adjusted under 35 U.S.C. 154(b) by 30 days.

(21) Appl. No.: 16/982,877

(22) PCT Filed: Mar. 11, 2019

(86) PCT No.: PCT/JP2019/009586
§ 371 (c)(1),
(2) Date: Sep. 21, 2020

(87) PCT Pub. No.: WO2019/181593
PCT Pub. Date: Sep. 26, 2019

(65) Prior Publication Data
US 2021/0058523 A1    Feb. 25, 2021

(30) Foreign Application Priority Data

Mar. 23, 2018   (JP) .............................. JP2018-057066

(51) Int. Cl.
G06F 3/04847    (2022.01)
H04N 1/00       (2006.01)
G06F 3/0484     (2022.01)
H04N 1/40       (2006.01)

(52) U.S. Cl.
CPC ....... H04N 1/00411 (2013.01); G06F 3/0484 (2013.01); H04N 1/40062 (2013.01)

(58) Field of Classification Search
None
See application file for complete search history.

(56) References Cited

U.S. PATENT DOCUMENTS

| | | | |
|---|---|---|---|
| 6,718,378 B1 * | 4/2004 | Machida | H04L 43/00 709/223 |
| 8,934,131 B2 * | 1/2015 | Hasegawa | H04N 1/3871 358/1.2 |
| 10,506,116 B2 * | 12/2019 | Hattori | G06F 3/04883 |
| 2004/0205169 A1 | 10/2004 | Machida | |
| 2007/0139694 A1 | 6/2007 | Kingsley | |
| 2009/0097043 A1 | 4/2009 | Gotoh | |
| 2014/0185103 A1 | 7/2014 | Tsugimura | |

FOREIGN PATENT DOCUMENTS

| | | |
|---|---|---|
| CN | 101415061 A | 4/2009 |
| JP | 2001-14255 | 1/2001 |
| JP | 2014-128025 | 7/2014 |

* cited by examiner

*Primary Examiner* — Paul F Payer

(57) ABSTRACT

A visibility adjusting unit (22) displays on the display device (15a) a user interface to specify a visibility level, detects with the input device (15b) a user operation performed to the user interface such that the user operating specifies a visibility level, determines the visibility level based on the detected user operation, and converts the determined visibility level to a resolution in accordance with a predetermined conversion rule. The scan control unit (21) specifies to the image scanning unit (11) the resolution obtained in the conversion performed by the visibility adjusting unit (22) and causes the image scanning unit (11) to generate image data of the document image, and converts the generated image data to image data of a specified data type.

4 Claims, 6 Drawing Sheets

FIG. 4

| VISIBILITY LEVEL | | | -5 | -4 | -3 | -2 | -1 | 0 | ⋯ |
|---|---|---|---|---|---|---|---|---|---|
| RESOLUTION (DPI) | COLOR MODE: FULL COLOR / GRAYSCALE DATA FORMAT: JPEG | IMAGE TYPE: CHARACTER+PHOTOGRAPH | 100 | 125 | 150 | 200 | 250 | 300 | |
| | | IMAGE TYPE: PHOTOGRAPH | 75 | 100 | 150 | 200 | 250 | 300 | |
| | | IMAGE TYPE: CHARACTER | 175 | 200 | 225 | 250 | 275 | 300 | |
| | COLOR MODE: MONOCHROME DATA FORMAT: TIFF | IMAGE TYPE: CHARACTER+PHOTOGRAPH | 75 | 100 | 150 | 200 | 250 | 300 | |
| | | IMAGE TYPE: PHOTOGRAPH | 75 | 100 | 150 | 200 | 250 | 300 | |
| | | IMAGE TYPE: CHARACTER | 75 | 100 | 150 | 200 | 250 | 300 | |
| ⋯ | | | | | | | | | |

FIG. 5

| SIZE SHRINKING RATIO | | | 50% | 60% | 70% | 80% | 90% | 100% | ... |
|---|---|---|---|---|---|---|---|---|---|
| RESOLUTION (DPI) | COLOR MODE: FULL COLOR / GRAYSCALE DATA FORMAT: JPEG | IMAGE TYPE: CHARACTER+PHOTOGRAPH | 100 | 125 | 150 | 200 | 250 | 300 | |
| | | IMAGE TYPE: PHOTOGRAPH | 100 | 125 | 150 | 200 | 250 | 300 | |
| | | IMAGE TYPE: CHARACTER | 100 | 125 | 150 | 200 | 250 | 300 | |
| | COLOR MODE: MONOCROME DATA FORMAT: TIFF | IMAGE TYPE: CHARACTER+PHOTOGRAPH | 75 | 120 | 150 | 200 | 250 | 300 | |
| | | IMAGE TYPE: PHOTOGRAPH | 75 | 120 | 150 | 200 | 250 | 300 | |
| | | IMAGE TYPE: CHARACTER | 90 | 120 | 150 | 200 | 250 | 300 | |
| ... | | | | | | | | | |

IMAGE SCANNING APPARATUS

TECHNICAL FIELD

The present invention relates to an image scanning apparatus.

BACKGROUND ART

An image scanning apparatus such as multi function peripheral has a Scan-to-Send function using SMB (Server Message Block), FTP (File Transfer Protocol), or email, a scanning data transmission function to a TWAIN driver, or the like. In these functions, reduction of a data size to be transmitted is requested in order to reduce network traffic.

In general, a data size of scanning data is reduced by decreasing a resolution of image scanning. Further, using a highly compressed PDF (Portable Document Format) technique, scanning data can be changed to a PDF file of a small data size.

An image processing apparatus displays a slider bar as a user interface, and compresses image data in accordance with a compression method corresponding to a position of a slider on the slider bar (see PATENT LITERATURE #1, for example).

CITATION LIST

Patent Literature

PATENT LITERATURE #1: Japan Patent Application Publication No. 2014-128025.

SUMMARY OF INVENTION

Technical Problem

As mentioned, the data size can be reduced, but visibility of the image may be deteriorated. Users have different visibility requirements for a scanned image. In the aforementioned image processing apparatus, a user can adjust a data size of compressed image data using the slider bar, but does not specify a visibility of an image based on the compressed image data; and therefore, the user hardly reduces the data size properly so as to achieve his/her desired visibility.

The present invention has been conceived in view of the aforementioned problem, and an object of the present invention is to obtain an image scanning apparatus of which a user properly reduces a data size of scanning image data so as to achieve his/her own desired visibility.

Solution to Problem

An image scanning apparatus according to the present invention includes: an image scanning unit that optically scans a document image with a specified resolution and generates image data of the document image; a display device that displays an operation screen to a user; an input device that receives a user operation; a visibility adjusting unit that (a) displays on the display device a user interface to specify a visibility level, (b) detects with the input device a user operation performed to the user interface, the user operating specifying a visibility level, (c) determines the visibility level based on the detected user operation, and (d) converts the determined visibility level to a resolution in accordance with a predetermined conversion rule; and a scan control unit that specifies to the image scanning unit the resolution obtained in the conversion performed by the visibility adjusting unit and causes the image scanning unit to generate image data of the document image, and converts the generated image data to image data of a specified data type.

Advantageous Effect of Invention

By means of the present invention, obtained is an image scanning apparatus of which a user properly reduces a data size of scanning image data so as to achieve his/her own desired visibility.

These and other objects, features and advantages of the present invention will become more apparent upon reading of the following detailed description along with the accompanied drawings.

BRIEF DESCRIPTION OF DRAWINGS

FIG. 4 shows a diagram that indicates an example of a relationship between visibility levels and resolutions, as a conversion rule used by a visibility adjusting unit 22 shown in FIG. 1;

FIG. 5 shows a diagram that indicates an example of a relationship between size shrinking ratios and resolutions, used by the visibility adjusting unit 22 shown in FIG. 1.

DESCRIPTION OF EMBODIMENTS

Hereinafter, an embodiment according to aspects of the present invention will be explained with reference to drawings.

Figure 1:
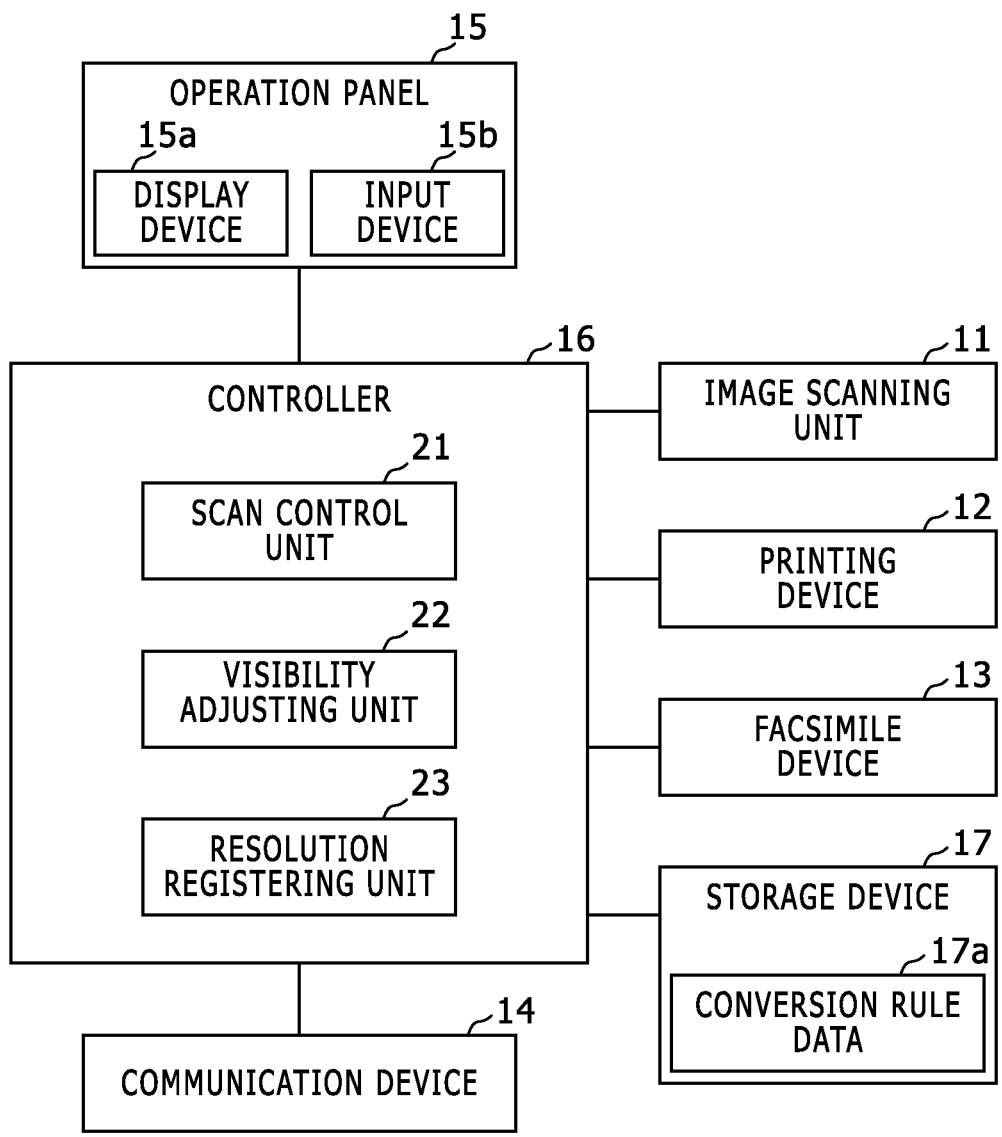
FIG. 1 shows a block diagram that indicates a configuration of an image scanning apparatus according to an embodiment of the present invention.

FIG. 1 shows a block diagram that indicates a configuration of an image scanning apparatus according to an embodiment of the present invention. The image scanning apparatus shown in FIG. 1 is a multi function peripheral, a copier, a scanner, or the like, that has an image scanning function. The image scanning apparatus shown in FIG. 1 includes an image scanning unit 11, a printing device 12, a facsimile device 13, a communication device 14, an operation panel 15, a controller 16, a storage device 17, and the like.

The image scanning unit 11 is an internal device that optically scans with a specified resolution, a document image from a document put on a platen glass or a document fed by an auto document feeder, and generates image data of the document image.

The printing device 12 is an internal device that prints a document image or the like.

The facsimile device 13 is an internal device that transmits the image data obtained with the scanning as a facsimile signal, and receives a facsimile signal and generates its image data.

The communication device 14 is an internal device such as network interface or a near field communication interface, that performs data communication with a terminal device or a server (not shown).

The operation panel 15 is arranged on an upper surface of a housing of the image scanning apparatus, and includes a display device 15*a* that displays an operation screen to a user and an input device 15*b* that receives a user operation. The display device 15*a* is a liquid crystal display and/or the like. Further, the input device 15*b* is a hard key, a touch panel that forms a soft key together with the display device 15*a*, and/or the like.

The controller 16 includes a computer that includes a CPU (Central Processing Unit), a ROM (Read Only Memory), a RAM (Random Access Memory), and the like, an ASIC (Application Specific Integrated Circuit), and/or the like; and acts as processing units. Specifically, the controller 16 loads a program stored in the ROM or the storage device 17 to the RAM, and executes the program with the CPU and thereby acts as processing units, namely by means of software, and/or acts as processing units using the ASIC or the like and the like, namely by means of hardware. Further, the controller 16 controls the internal devices and thereby performs sorts of processes.

The storage device 17 is a non volatile storage device such as a flash memory, and stores data and programs. The storage device 17 stores conversion rule data 17*a* and the like.

The controller 16 acts as a scan control unit 21, a visibility adjusting unit 22, and a resolution registering unit 23.

The scan control unit 21 specifies a resolution to the image scanning unit 11, and causes the image scanning unit to generate image data of a document image with the resolution, and converts the generated image data to image data of a specified data type (i.e. a color mode, a data format and/or the like). The color mode is full color, grayscale, monochrome binary image, or the like; and the data format is JPEG (Joint Photographic Experts Group), TIFF (Tagged Image File Format), PDF, highly compression PDF, XPS (XML Paper Specification), or the like.

The visibility adjusting unit 22 (*a*) displays on the display device 15*a* a user interface to specify a visibility level, (b) detects with the input device 15*b* a user operation performed to the user interface such that the user operating specifies a visibility level, (c) determines the visibility level based on the detected user operation, and (d) reads the conversion rule data 17*a* and converts the determined visibility level to a resolution in accordance with a predetermined conversion rule in the conversion rule data 17*a*. The scan control unit 21 specifies to the image scanning unit 11 the resolution after the conversion performed by the visibility adjusting unit 22 and causes the image scanning unit 11 to generate image data of the document image.

Figure 2:
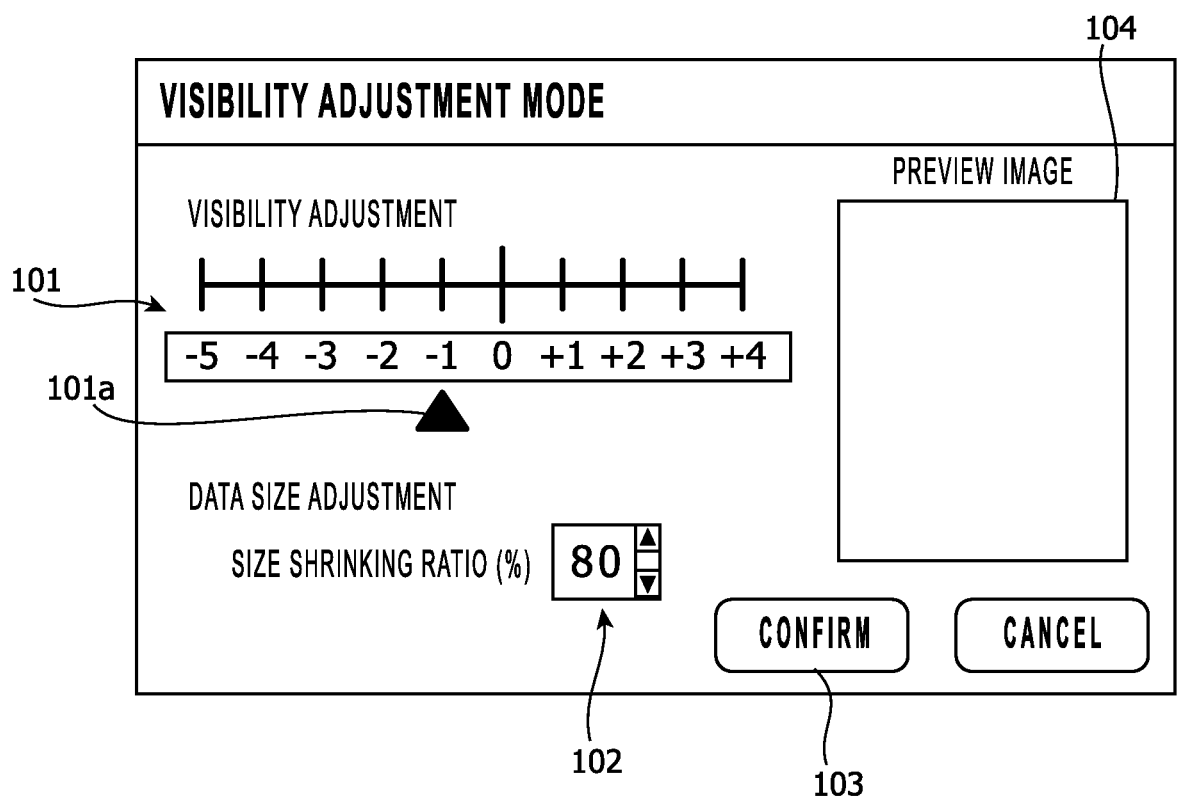
FIG. 2 shows a diagram that indicates an example of an operation screen that includes a visibility adjustment user interface.

FIG. 2 shows a diagram that indicates an example of an operation screen that includes a visibility adjustment user interface. In this embodiment, the aforementioned user interface includes a slider bar 101 as shown in FIG. 2, for example. The slider bar 101 includes a slider 101*a*, and the visibility adjusting unit 22 changes a position of the slider 101*a* in accordance with a user operation to the input device 15*b*. Further, the visibility adjusting unit 22 determines a visibility level on the basis of the position of the slider 101*a*.

Further, as shown in FIG. 2, the aforementioned user interface further includes an input field 102 to specify a shrinking ratio of a data size. Further, the visibility adjusting unit 22 determines a resolution corresponding to the shrinking ratio specified in the input field 102, determines a visibility level corresponding to the determined resolution, and moves the slider 101*a* to a position corresponding to the determined visibility level. Furthermore, if a confirm key 103 (soft key) is pressed down, then the visibility level corresponding to the current slider 101*a* is specified.

In this embodiment, the conversion rule is set for each of image types that include character, photograph, and combination of character and photograph. Further, the visibility adjusting unit 22 detects with the input device 15*a* a user operation to specify an image type of the document image, determines the image type corresponding to the detected user operation, and converts the determined visibility level to the resolution in accordance with the conversion rule set for the determined image type.

Furthermore, in this embodiment, the conversion rules are set respectively for the aforementioned image type and the data type of image data of the document image, and the visibility adjusting unit 22 converts the determined visibility level to the resolution in accordance with the conversion rule set for the determined image type and the data type (setting values of a color mode and a data format).

Figure 3:
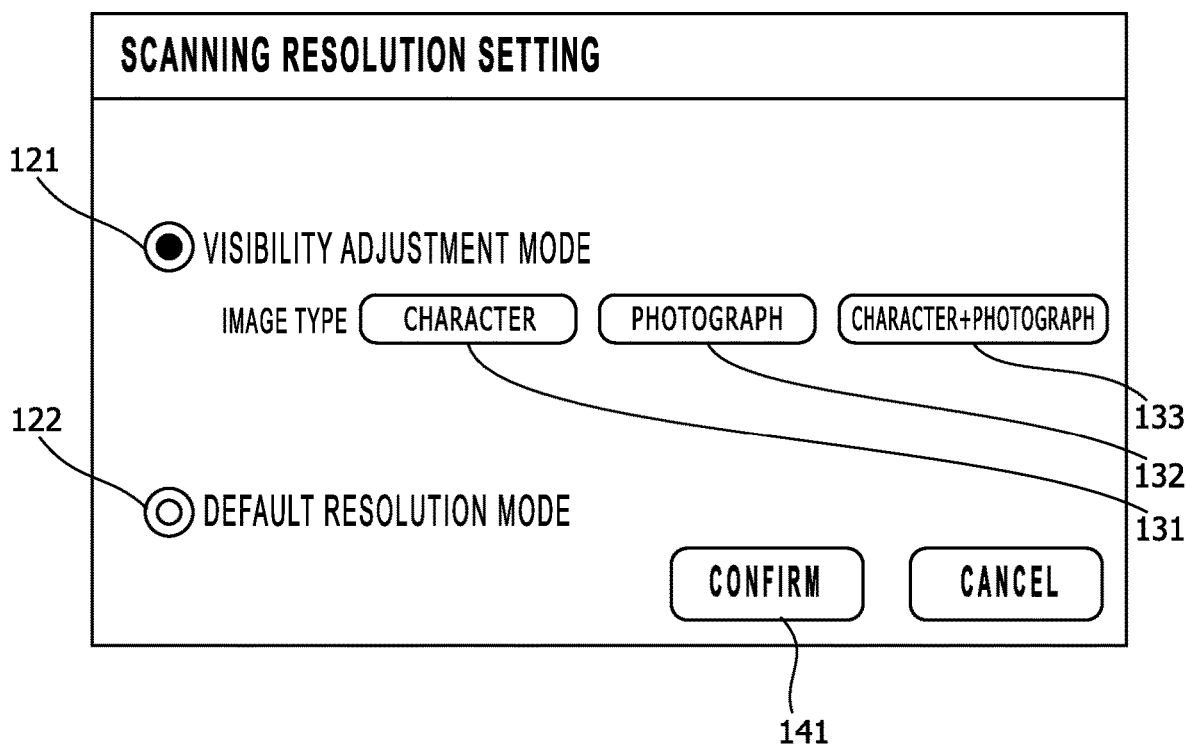
FIG. 3 shows a diagram that indicates an example of an operation screen for specifying an image type of a document image.

FIG. 3 shows a diagram that indicates an example of an operation screen for specifying an image type of a document image. The visibility adjusting unit 22 displays an operation screen on the display device 15*a* as shown in FIG. 3, for example. This operation screen includes a radio buttons 121 and 122 corresponding to selection items of resolution modes. If the radio button 121 is checked by a user operation to the input device 15*b*, then a visibility adjustment mode is selected as the resolution mode. If the radio button 122 is checked by a user operation to the input device 15*b*, then a default resolution mode is selected as the resolution mode. This operation screen includes soft keys 131, 132, and 133 that are an operation unit to specify an image type of the document image. The soft key 131 corresponds to the image type "character", the soft key 132 corresponds to the image type "photograph", and the soft key 133 corresponds to the image type "character+photograph". Upon pressing down any of the soft keys 131, 132, and 133, the image type corresponding to the pressed-down soft key 131, 132, or 133 is specified.

Afterward, upon pressing down the confirm key 141 (soft key), specified is the mode corresponding to the currently-checked radio button 121 or 122, and specified is the image type corresponding to the soft key 131, 132, or 133 currently selected.

FIG. 4 shows a diagram that indicates an example of a relationship between visibility levels and resolutions, as a conversion rule used by a visibility adjusting unit 22 shown in FIG. 1. For example, as shown in FIG. 4, conversion rules are set in the conversion rule data 17*a* correspondingly to combinations of the color mode, the data format and the image type, respectively. Upon specifying the image type and the like, the visibility adjusting unit 22 converts the determined visibility level to a resolution in accordance with a conversion rule corresponding to the image type and the like, for example, in accordance with the conversion rule shown in FIG. 4.

FIG. 5 shows a diagram that indicates an example of a relationship between size shrinking ratios and resolutions, used by the visibility adjusting unit 22 shown in FIG. 1. For example, as shown in FIG. 5, relationships between size shrinking ratios (i.e. ([data size before shrinking]−[data size after shrinking])/[data size before shrinking]*100 percent) and resolutions are set in the conversion rule data 17*a* corresponding to combinations of the color mode, the data formation, and the image type, respectively. Upon specifying a size shrinking ratio in the input field 102, the visibility adjusting unit 22 changes a position of the slider 101a correspondingly to the specified size shrinking ratio, and converts a visibility level corresponding to the position of the slider 101a to a resolution.

Further, for example, as shown in FIG. 2, the operation screen including the visibility adjustment user interface includes a preview image area 104, and the visibility adjusting unit 22 performs the resolution conversion of the document image to a resolution corresponding to a visibility level of a current position of the slider 101a, and displays the document image after the resolution conversion, as a preview image in the preview image area 104. Therefore, every time that a position of the slider 101a is changed, a resolution of the document image displayed in the preview image area 104 is changed. Further, the document images of which resolutions have been converted correspondingly to visibility levels of plural scale marks of the slider bar 101 may be displayed at positions corresponding to the scale marks.

Furthermore, the resolution registering unit 23 registers a relationship between a visibility level and a resolution in the aforementioned conversion rule in accordance with a user operation detected by the input device 15b. Furthermore, the resolution registering unit 23 displays on the display device 15a a relationship between a visibility level and a resolution, registered in the conversion rule data 17a in accordance with a user operation detected by the input device 15b. Consequently, a user can set his/her desired resolution corresponding to each visibility level and also can browse a currently-set resolution.

Figure 6:
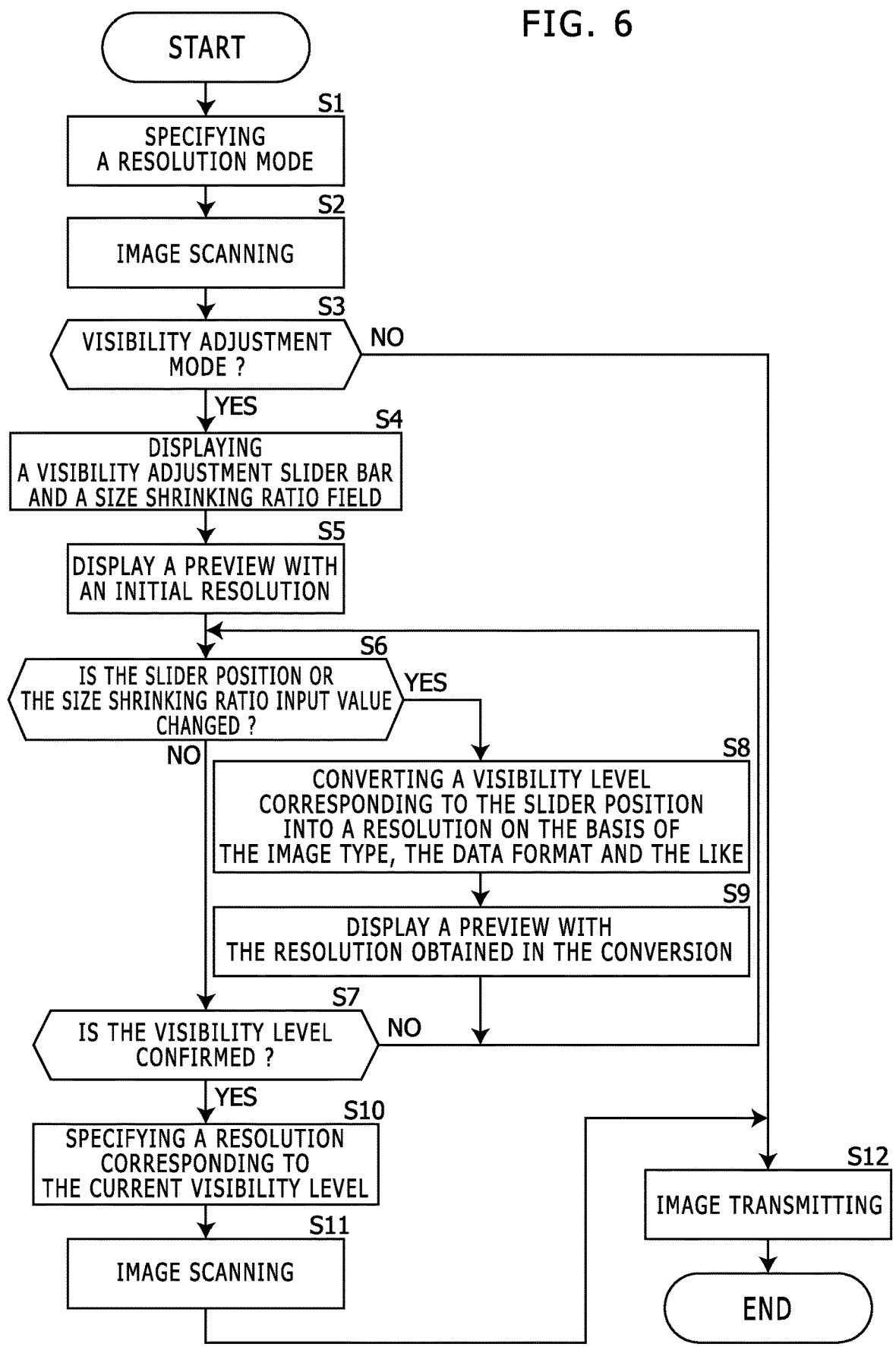
FIG. 6 shows a flowchart that explains a behavior of the image scanning apparatus shown in FIG. 1.

The following part explains a behavior of the aforementioned image scanning apparatus. FIG. 6 shows a flowchart that explains a behavior of the image scanning apparatus shown in FIG. 1.

Firstly, when performing a job using the Scan-to-Send function, the visibility adjusting unit 22 determines a resolution mode and an image type that are specified by a user, as mentioned (in Step S1).

Subsequently, the scan control unit 21 controls the image scanning unit 11 and thereby performs scanning of a document image with a default resolution (e.g. vertical 300 dpi by horizontal 300 dpi), and acquires image data (raw data) of the document image (in Step S2).

Subsequently, the visibility adjusting unit 22 determines whether the specified resolution mode is the visibility adjustment mode or not (in Step S3).

If the specified resolution mode is the visibility adjustment mode, then as shown in FIG. 2, for example, the visibility adjusting unit 22 displays as an interface for visibility adjustment on the display device 15a an operation screen that includes the slider bar 101 for a visibility level and the input field 102 for a size shrinking ratio (in Step S4).

Subsequently, the visibility adjusting unit 22 displays the scanned document image in the preview image area 104 with an initial resolution (here, the default resolution) (in Step S5).

The visibility adjusting unit 22 watches whether one of a position of the slider 101a and an input value of the input field 102 is changed with a user operation to the input device 15 or not (in Step S6) and whether a visibility level is confirmed or not (in Step S7).

Upon changing one of a position of the slider 101a and an input value of the input field 102, the visibility adjusting unit 22 interlockingly changes the other of a position of the slider 101a and an input value of the input field 102, determines a conversion rule corresponding to the image type and the like, and converts a visibility level corresponding to the current position of the slider 101a to a resolution in accordance with the determined conversion rule (in Step S8). Subsequently, the visibility adjusting unit 22 performs resolution conversion of the scanned document image to the resolution obtained in the conversion, and renews the image in the preview image area 104 with the document image after the resolution conversion (in Step S9).

Upon pressing down the confirm key 103 and thereby confirming the visibility level, the visibility adjusting unit 22 specifies to the scan control unit 21 a resolution corresponding to the current visibility level (in Step S10); and the scan control unit 21 specifies this resolution to the image scanning unit 11 and causes the image scanning unit 11 to perform scanning of the document image and acquires image data of the document image (in Step S11), and transmits this image data as a data file in a data format specified in a user setting or the like, to a terminal device or a server (not shown) in accordance with a predetermined protocol (SMB, FTP, email, or the like) using the communication device 14 (in Step S12).

Further, if the default resolution mode is specified as the resolution mode (in Step S3), the scan control unit 21 transmits the image data acquired in Step S2 as a data file in a data format specified in a user setting or the like, to a terminal device or a server (not shown) in accordance with a predetermined protocol using the communication device 14 (in Step S12).

As mentioned, in the aforementioned embodiment, the image scanning unit 11 optically scans a document image with a specified resolution and generates image data of the document image. The visibility adjusting unit 22 (a) displays on the display device 15a a user interface to specify a visibility level, (b) detects with the input device 15b a user operation performed to the user interface such that the user operating specifies a visibility level, (c) determines the visibility level based on the detected user operation, and (d) converts the determined visibility level to a resolution in accordance with a predetermined conversion rule. The scan control unit 21 specifies to the image scanning unit 11 the resolution obtained in the conversion performed by the visibility adjusting unit 22 and causes the image scanning unit 11 to generate image data of the document image, and converts the generated image data to image data of a specified data type.

Consequently, in the Scan-to-Send function or the like, by specifying a visibility level, a user can generate image data of the document image with a resolution to obtain a user's desired visibility. Therefore, while the user achieves his/her own desired visibility, the user can reduce a data size of the scanning image data.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to an image scanning apparatus.

The invention claimed is:

1. An image scanning apparatus, comprising:
an image scanning unit that optically scans a document image with a specified resolution and generates image data of the document image;
a display device that displays an operation screen to a user;
an input device that receives a user operation;
a visibility adjusting unit that (a) displays on the display device a user interface to specify a visibility level, (b) detects with the input device a user operation performed to the user interface, the user operation specifying a visibility level, (c) determines the visibility level based on the detected user operation, and (d) converts the determined visibility level to a resolution in accordance with a predetermined conversion rule; and
a scan control unit that specifies to the image scanning unit the resolution obtained in the conversion performed by the visibility adjusting unit and causes the image scanning unit to generate image data of the document image, and converts the generated image data to image data of a specified data type;
wherein the user interface includes a slider bar capable of changing a position of a slider in accordance with a user operation to the input device and an input field to specify a shrinking ratio of a data size; and
wherein the visibility adjusting unit determines a resolution corresponding to a shrinking ratio specified in the input field, determines a visibility level corresponding to the determined resolution, and moves the slider to a position corresponding to the determined visibility level.

2. An image scanning apparatus, comprising:
an image scanning unit that optically scans a document image with a specified resolution and generates image data of the document image;
a display device that displays an operation screen to a user;
an input device that receives a user operation;
a visibility adjusting unit that (a) displays on the display device a user interface to specify a visibility level, (b) detects with the input device a user operation performed to the user interface, the user operation specifying a visibility level, (c) determines the visibility level based on the detected user operation, and (d) converts the determined visibility level to a resolution in accordance with a predetermined conversion rule;
a scan control unit that specifies to the image scanning unit the resolution obtained in the conversion performed by the visibility adjusting unit and causes the image scanning unit to generate image data of the document image, and converts the generated image data to image data of a specified data type;
wherein the conversion rule is set for each of image types that include character, photograph, and combination of character and photograph; and
the visibility adjusting unit detects with the input device a user operation to specify an image type of the document image, determines the image type corresponding to the detected user operation, and converts the determined visibility level to the resolution in accordance with the conversion rule set for the determined image type.

3. The image scanning apparatus according to claim 2, wherein the conversion rule is set for each of the image types and each of data types of the image data; and
the visibility adjusting unit converts the determined visibility level to the resolution in accordance with the conversion rule set for the determined image type and the data type.

4. An image scanning apparatus, comprising:
an image scanning unit that optically scans a document image with a specified resolution and generates image data of the document image;
a display device that displays an operation screen to a user;
an input device that receives a user operation;
a visibility adjusting unit that (a) displays on the display device a user interface to specify a visibility level, (b) detects with the input device a user operation performed to the user interface, the user operation specifying a visibility level, (c) determines the visibility level based on the detected user operation, and (d) converts the determined visibility level to a resolution in accordance with a predetermined conversion rule;
a scan control unit that specifies to the image scanning unit the resolution obtained in the conversion performed by the visibility adjusting unit and causes the image scanning unit to generate image data of the document image, and converts the generated image data to image data of a specified data type; and
a resolution registering unit that registers a relationship between the visibility level and the resolution in the conversion rule, in accordance with a user operation detected by the input device.

* * * * *